United States Patent [19]

Linderoth

[11] 3,864,206

[45] Feb. 4, 1975

[54] STRUCTURALLY SUPPORTED, DIMENSIONALLY ACCURATE, SHAPED ARTICLES AND METHOD OF PRODUCING THE SAME

[76] Inventor: Rodney V. Linderoth, 18 Maple St., Portville, N.Y. 14770

[22] Filed: Apr. 17, 1972

[21] Appl. No.: 244,556

[52] U.S. Cl............... 162/103, 156/79, 156/245, 161/160, 161/DIG. 5, 162/201, 264/45, 264/DIG. 6, 264/DIG. 7
[51] Int. Cl............................ B32b 3/00, B32b 5/18
[58] Field of Search............................ 156/77–79, 156/62.2, 245, 287, 293; 161/159–161, DIG. 5; 264/45–47, 92, 109, DIG. 6, DIG. 7; 162/116, 212, 217, 101, 103, 201

[56] References Cited
UNITED STATES PATENTS

| | | | |
|---|---|---|---|
| 2,973,558 | 3/1961 | Stratton, Jr.............. | 264/92 |
| 3,091,563 | 5/1963 | Meyer................... | 162/217 |
| 3,257,252 | 6/1966 | Keel..................... | 156/79 |
| 3,565,753 | 2/1971 | Yurkowitz.............. | 161/DIG. 5 |
| 3,598,672 | 8/1971 | Heller................... | 161/160 |
| 3,655,840 | 4/1972 | Krug..................... | 264/45 |
| 3,698,993 | 10/1972 | Rauh..................... | 161/162 |

*Primary Examiner*—William J. Van Balen
*Assistant Examiner*—Paul J. Thibodeau
*Attorney, Agent, or Firm*—Anthony A. O'Brien

[57] ABSTRACT

A method of producing dimensionally accurate, structurally supported, shaped articles includes forming a wet felted mat of pulped fibers on a foraminous forming mold, filling a hollow portion of the wet felted mat with a rigid core such as a plastic foam while the felted mat is supported by the forming mold, bonding the core material to the wet felted mat to form an integral shell and core for the shaped article, removing the integral shell and core, and drying the wet felted mat with the core acting as a transfer means for removing the integral shell and core and acting as a form to retain dimensional stability of the felted mat during drying. A structurally supported, dimensionally accurate, shaped article is produced by the above method.

10 Claims, 3 Drawing Figures

PATENTED FEB 4 1975 3,864,206

STRUCTURALLY SUPPORTED, DIMENSIONALLY ACCURATE, SHAPED ARTICLES AND METHOD OF PRODUCING THE SAME

BACKGROUND OF THE INVENTION

1. Field of the Invention

The present invention pertains to shaped articles and, more particularly, to dimensionally accurate, structurally supported, shaped articles and methods of producing the same.

2. Description of the Prior Art

Rigid or structurally supported shaped articles have many uses such as, for instance, in the packaging and handling of fragile or easily damaged articles during shipping, for supports of a pallet-like nature and for supports of specifically designed configurations for relatively heavy shaped products. Generally, it is desirable for such shaped articles to have great structural strength to prevent buckling and concomitant damage to the supported object; however, rigid, shaped articles are also desired to be relatively light in that such shaped articles normally must be manipulated during shipping and general transportation of the products. That is, transportation costs are decreased and the facility of manipulation of the entire shipped package is increased directly dependent upon the reduction weight or density of the shaped article.

Pulped cellulose fibers are a particularly advantageous material for use in making shaped articles in that such material is relatively inexpensive due to its availability as a waste product and further due to its reusability. One method commonly used in the production of shaped articles of molded pulped fibers is to provide a thin water slurry of pulped cellulose fibers and to suck the fibers from the slurry through a foraminous mold by means of a vacuum such that a felted mat composed of the pulped cellulose fibers is collected on the foraminous mold. The wet felted mat is then removed manually or mechanically from the foraminous mold and dried in heated ovens. Shaped articles formed by the above described method include egg cartons, paper and pie plates, flower pots, jardinieres and the like.

Because cellulose fibers absorb water and expand while being pulped and processed, molded shaped articles made from cellulose fibers tend to shrink, warp and generally distort in configuration during drying in a unrestrained state after removal from the foraminous mold. In light-weight, thin-wall, shaped articles such as egg carbons or paper plates the deformation of the configuration during drying does not present major problems and can be overcome in various ways such as light, die-pressing or stacking and packing of the wet, shaped articles before drying is complete.

Another approach to solving the problem of deformation during drying of shaped articles is to dry the articles while the articles are still on the foraminous forming mold such that the mold or die on which the felted mat was originally collected or accumulated restrains and controls shrinkage and warpage during drying of the articles resulting in dried articles with improved dimensional characteristics. The latter method of solving the problem of distortion during drying, however, requires machines or apparatus of large physical dimensions acting as both forming or molding apparatus as well as drying apparatus thereby requiring a considerably larger number of forming molds. After the shaped articles are formed in the foraminous forming molds, the articles are moved through a much longer drying step prior to removal of the dried articles from the molds thereby freeing the forming mold for use in forming another shaped article. Obviously an increased number of forming molds are required in order to implement the above described solution to the problem of deformation during drying of shaped articles thereby greatly increasing storage, initial expense and tooling costs.

The drying of the felted mat in the forming mold presents a substantially satisfactory solution to the deformation problem in the production of light-weight articles such as egg cartons or paper plates since such articles can be dried in a reasonably short period of time due to their having a mat thickness normally less than one sixteenth of an inch. The shorter drying time, of course, limits the number of forming molds required; however, as the thickness of the felted mat increases, the drying time increases finally reaching a point where the above mentioned solution does not present a viable method of overcoming drying deformation.

In the production of heavy, molded pulp, shaped articles such as flower vases, jardinieres, packaging materials and the like of felted mat ranging from one-fourth inch up to one or more inches in heavy sections, the drying time required for the felted mat, even when the felted mat is subjected to a vacuum, renders drying of the felted mat on the molding form prohibitive both due to the size of the machine required and the tooling requirements. Furthermore, shrinkage and distortion have a greater effect on heavy molded pulp articles relative to light molded pulp articles, and when relatively heavy, molded pulp, shaped articles are dried after removal from the forming mold, shrinkage is greatly increased due to the great mass and unequal distribution of the felted mat.

Another problem with the drying of heavy, molded pulp, shaped articles is the difficulty in handling a large, wet, molded pulp, shaped article, and transporting the article from the forming mold to a drying oven. Accordingly, damage and distortion to the configuration of the molded article often occurs during the transportation between the form and the oven. To obviate the problems concomitant with the transporting of the wet articles, transfer molds are used, and various types of drying or restraining forms are placed in or on the wet felted mat to control distortion or shrinkage while drying.

The above mentioned attempts to prevent drying deformation are not fully effective; and, in the past, it has been virtually impossible from an economic standpoint to maintain relatively accurate dimensional tolerance, surface characteristics, and configuration of the article relative to the original forming mold after the heavy, wet, felted mat has been removed therefrom. As a result, the many applications for which it would be desirable to use molded, pulped fibers due to its characteristic of being a low cost material, many times available as a waste product, cannot be fully realized.

A further disadvantage to drying molded, pulped fiber articles on the original foraminous molded form or on a precision, close tolerance drying form is that it is often desired to indurate the felted mat with hardening agents such as resins, sodium silicate or other like materials to increase the strength and durability thereof. Such materials to be added often have a strong, adhesive characteristic thereby rendering removal of the felted mat after drying in the form virtually impossible.

SUMMARY OF THE INVENTION

Accordingly, it is an object of the present invention to construct a dimensionally accurate, structurally supported, shaped article of pulped fibers by a method overcoming the above mentioned disadvantages.

The present invention is generally characterized in a method of producing dimensionally accurate, structurally supported, shaped articles of fibers including forming a felted mat of fibers with a hollow portion, introducing the hollow portion of the felted mat with a core material, and bonding the core material with the felted mat. The present invention is further generally characterized in that a structurally supported, shaped article includes a hollow shell constructed of a felted mat of pulped fibers, and a core material disposed in the hollow portion of the shell and secured thereto.

A primary object of the present invention is to provide an extraordinarily large, structurally supported, shaped article having a rigid core integral with a shell made of a wet felted mat for transfering the wet felted mat from a foraminous forming mold to a drying oven, for providing a drying form for the felted mat to minimize shrinkage and warpage of the felted mat during drying, and for providing dimensional accuracy of the shaped article as a true reproduction corresponding to the configuration of the forming mold.

It is another object of this invention to increase greatly the size of molded fiber shaped articles which heretofore were not producible by conventional methods.

Another object of the present invention is to provide a structurally supported, shaped article constructed of an outer shell of a felted mat of pulped fibers and a rigid inner core.

A further object of this invention is to produce a dimensionally accurate, structurally supported, shaped article of extraordinary size from pulped fibers by filling a molded felted mat of the pulp fibers with a core material while the felted mat is wet.

The present invention has an additional object in that a structurally supported, shaped article has an inner core formed of a porous material such as a formed plastic or a suitably bonded aggregate or a combination thereof.

Yet another object of this invention is to construct a structurally supported shaped article of inexpensive materials of a nature so as to be available as waste products from other processes.

Some of the advantages of the present invention over the prior art are that the structurally supported, shaped article of the present invention is inexpensive to produce, has great structural strength, is light in weight and has a low density and that the method of producing dimensionally accurate, structurally supported, shaped articles of pulped fibers according to the present invention permits the wet felted mat to be removed from a forming apparatus without distortion, the felted mat to be dried without dimensional deformation, structural support to be provided for the shaped article by the core, hardening agents to be added to the shaped article without damaging or otherwise adversely affect the formed molds and apparatus, and minimizing of apparatus size and tooling.

Other objects and advantages of the present invention will become apparent from the following description of the preferred embodiments taken in conjunction with the accompanying drawings.

DESCRIPTION OF THE PREFERRED EMBODIMENTS

Figure 1:
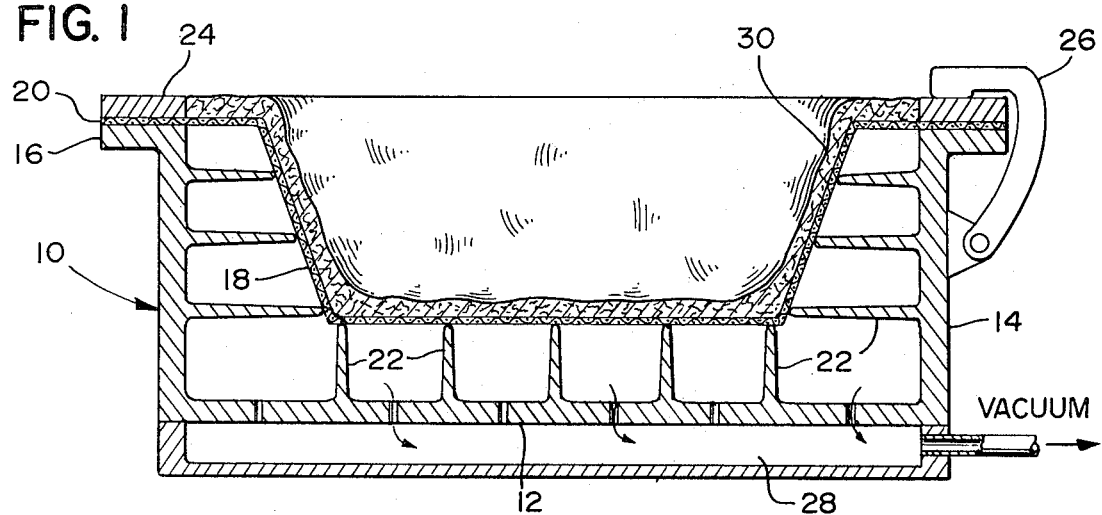
FIG. 1 is an elevational view in section of felted mat forming apparatus for use with the present invention.

The method of the present invention will be described with respect to the apparatus illustrated in FIGS. 1 and 2. The initial step of the method of the present invention is to immerse mold forming apparatus, as illustrative in FIG. 1 to a slurry of pulped fibers and liquid and draw the fibers in a felted fashion onto a mold surface. The mold forming apparatus includes a housing 10 made of any suitable material, such as wood, metal or plastic, and having a perforated bottom wall 12 and upstanding side walls 14 terminating at an outwardly extending lip 16. A foraminous forming mold 18, made in any suitable fashion as is common in the paper making and pulp forming industry, such as surface-perforated metals or plastics, as screens, meshes and the like, has a top flange 20 extending therearound to engage lip 16 of the housing, and the foraminous forming mold 18 has a configuration corresponding to the external configuration of the structurally supported shaped article to be produced. Forming mold 18 extends within housing 10 and is supported therein by a plurality of spaced ribs 22. The support provided by ribs 22 serves to assure that the foraminous molding form 18, which is normally in the form of a very thin mesh screen combined with a heavier perforated sheeting, will not become deformed during the collecting of a felted mat thereon and will not collapse under vacuum; and accordingly any suitable support may be provided as long as air and water may pass therethrough such as, for example, bonded particles.

A frame 24 having a configuration corresponding to that of flange 20 of the forming mold is secured thereto in order to reinforce and rigidize the forming mold to facilitate handling thereof as will be appreciated from the following description of the method of the present invention. A plurality of clamps 26 are pivotally mounted on the housing 10 and are adapted, when moved to the position illustrated, to clamp the form 18 and the frame 24 to the housing 10; such clamps being equally spaced around the housing 10 with the number thereof dependent upon the force required to provide proper clamping.

Figure 2:
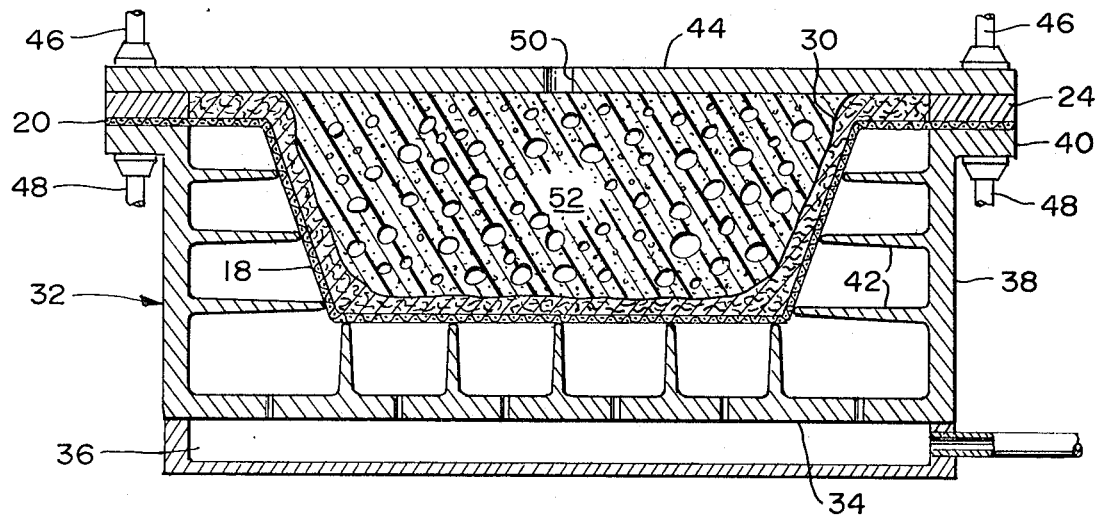
FIG. 2 is an elevational view in section of apparatus for forming a core within the felted mat according to the present invention.

A manifold 28 communicates with the perforated bottom wall 12 of housing 10; and, in order to collect a layer of pulped fibers in the form of a felted mat 30 along forming mold 18, the entire assembly of FIG. 1 is immersed in a pulped fiber and liquid slurry, such as by rotation along a wheel mounting a plurality of assemblies similar to that of FIG. 1. When immersed, a vacuum of negative pressure is supplied to manifold 28 in order to draw the pulped fibers in a felted fashion onto the forming surface of mold 18. The vacuum collects the felted mat 30; and, as the assembly is removed from the slurry, the vacuum is maintained in order to extract excess water from the felted mat. When the vacuum is removed, clamps 26 are released, and the forming mold 18 is removed from the housing 10 along with the felted mat 30.

The foraminous mold 18, thus, serves as a transfer carrier for the large wet felted mat and will not become deformed due to the reinforcement by frame 24. The forming mold 18 along with the wet felted mat 30 is transferred from the felt forming assembly of FIG. 1 to a filling or molding assembly as illustrated in FIG. 2. The filling assembly includes a housing 32 having a structure similar to that of the housing 10 of the forming assembly including a perforated bottom wall 34 communicating with a manifold 36 and side walls 38 terminating at an upper, outwardly extending lip 40. The housing 32 has a plurality of spaced ribs 42 therein to support the forming mold 18. Similar to ribs 22 in forming housing 10, ribs 42 may be replaced with any material configured to provide an appropriate mold cavity within the filling housing 32, such as bonded particles or a cast plastic, plaster, metal or other suitable material. The flange 20 of the forming mold along the frame 24 and a backing plate 44 are clamped to lip 40 by any suitable press and platen means such as movable clamping members 46 and 48 spaced around the periphery of the assembly as required.

Figure 3:
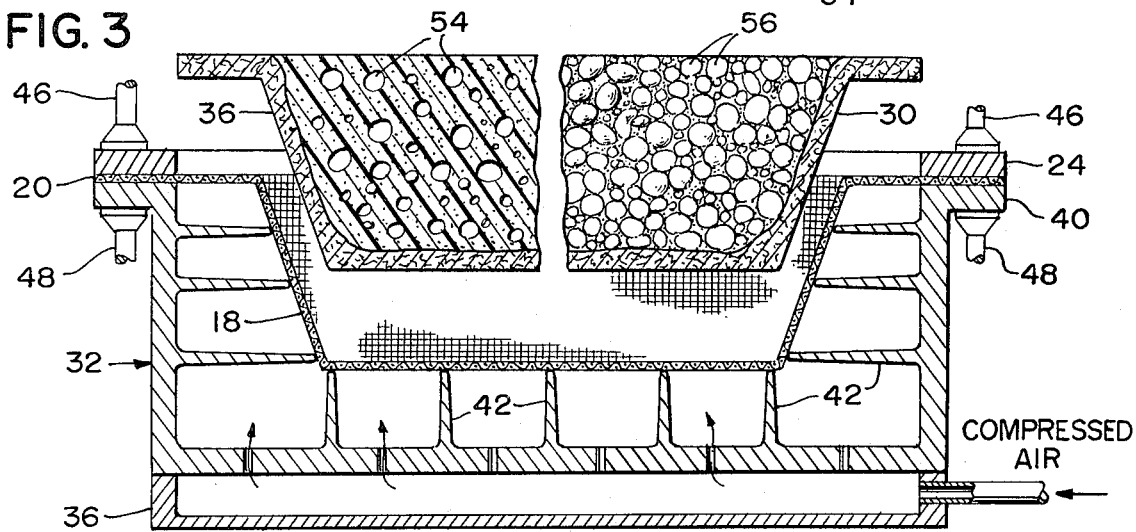
FIG. 3 is an exploded view in section of the structurally supported, shaped article of the present invention and the apparatus of FIG. 2.

Backing plate 44 has one or more apertures 50 therein in order to receive a low density material to fill the hollow portion formed in the wet felted mat 30; of course, the material may be introduced into the filling assembly before closing the cavity with the plate 44. Such material may include any low density material forming a rigid supportive mass, such as a suitable foam plastic material, e,g, urethane, phenolic, styrene, expanded polystyrene beads or the like. Preferably, a liquid, self-reacting exothermic plastic foam with surface adhesion properties is utilized to fill the cavity within the wet felted mat 30. Once the cavity is entirely filled, the core material is bonded to the wet felted mat by heating and/or curing; and thereafter, backing plate 44 is removed. The core material forms a rigid low density core 52, and the core 52 integral with the wet felted mat 30 is removed, as illustrated in FIG. 3, from the foraminous forming mold 18 by introduction of compressed air through manifold 36 or by any other suitable means. The wet, shaped article formed by the felted mat 30 and the core 52 is moved as an integral unit, with the core 52 acting in a transfer support capacity, to an oven or other drying device, where sufficient heat is applied to remove the water from the wet felted mat and dry the same.

The core 52 is securely bonded to the wet felted mat 30 due to the adhesive action of the core material with the fiber surface, and the bond formed between the felted mat 30 and the core 52 is extremely strong rendering the two virtually inseparable.

As an alternative, the filling and curing of the core within the felted mat may be performed in the original forming assembly, as illustrated in FIG. 1; however, it is preferred to transfer the forming mold and wet felted mat to a filling assembly in order to obtain optimum utilization of pulp forming machine time.

The structurally supported, shaped article formed by the method of the present invention can be relatively large in physical size and is strong and dimensionally stable due to the use of a core of rigid material which, when cured, acts as a means for transferring the wet fiber mat to an oven for drying and, as a drying form thereby preventing shrinkage, warpage and distortion of the felted mat during drying. Furthermore, the core 52 provides a structural support for the dried felted mat thereby providing a dimensionally accurate, shaped low density, article of great strength.

The core 52 of rigid material may be formed of a plastic foam which has a blowing agent for forming foam in situ after insertion within the hollow portion of the wet felted mat, or the porous material may take the form of particles bonded together with a suitable resin to form a bonded aggregate.

Plastic foams are preferred due to the speed of formation thereof, ease of handling and high strength-to-weight ratio. However, if desired, a filler or aggregate material may be introduced into the hollow portion of the wet felted mat in the interest of cost reduction thereby reducing the amount of new plastic material required. That is, plastic materials, such as a suitable bonding resin, are required in quantities only to be interspersed within the aggregate to sufficiently fill voids and to bond the entire mass together. Similarly, filler particles or aggregate may be utilized which have been precoated with a suitable resin or other adhesive material which, upon heating or curing, bonds particle to particle in an aggregate mass without filling the voids between the particles. Exemplary of material which may be utilized to provide an aggregate, but not limited thereto, are the following: plastic or glass particles or spheres, wood chips, gravel, walnut shells, corn cobs and the like. A preferred aggregate material is waste, expanded polystyrene beads recovered at low cost from factory trim or used expanded bead articles; the expanded polystyrene beads being of light weight and low cost. Of course, virgin expanded polystyrene beads may also be used.

In accordance with the present invention, the shaped article may be made from a core 52 of all plastic foam material, from a core 52 of plastic foam and spherical particles 54 (left side of FIG. 3) such as glass beads, plastic foams (e.g. polystyrene beads) and the like, or from a core 52 of plastic foam and solid particles 56 (right side of FIG. 3) having an irregular configuration such as gravel, plaster, wood chips, walnut shells and the like. The aggregate may be bonded solely with a suitable adhesive or resin, or a plastic foam foamed in situ may be utilized in combination therewith.

While a primary object of the present invention is to work with a wet felted mat of pulped fibers, the general principles of the present invention may be applied to shaped fiber articles formed by other means such as dry spraying or flocculating of fibers onto a shaped mold or die-pressing a shaped fiber mat from a sheet of fibers or by drying a wet felted mat on a forming mold or in a transfer or pressing die prior to filling with a plastic foam, resin and/or aggregate. It is noted, however, that superior results are obtained from both an economical and structural standpoint when the method is performed with the felted mat in a wet state.

Dimensionally accurate, structurally supported, shaped articles according to the present invention for use as packaging or handling materials and for other uses have precise external configurations. Structural strength is extremely important for shaped articles in accordance with the present invention in that such articles are normally relatively large and generally have a substantial length in three dimensions. Of course, the forming mold 18 can be provided with any desired configuration such that the shaped article formed therein has a specific configuration corresponding thereto.

The structurally supported, shaped article of the present invention not only presents an extremely desirable, low density, structurally strong unit, but the production of the shaped article of the present invention with the integral core permits the formation of dimensionally accurate external configurations for felted mats of pulped fibers, such as cellulose fibers, due to the use of the core as a restraining die during drying of the wet felted mat and as transfer means for moving the wet felted mat from a filling assembly to a drying device such as an oven. That is, the core 52 serves as a structural support and transfer agent for the wet felted mat as well as a drying form therefor.

The materials described for inclusion within the rigid, low density material forming the core may vary over a wide range, it being of primary importance only that such materials include a plastic foam, resin or adhesive providing satisfactory bonding in an aqueous environment.

As an example of the foregoing method and product, a firmly supported foraminous forming mold of a suitable female configuration is inserted into a room temperature water and cellulose fiber slurry consisting of one-half % by weight kraft celulose fibers in suspension. A vacuum of 10 to 20 inches of mercury is applied to the forming mold housing until a fiber deposit of three-sixteenths to one-fourth inch thick is collected on the forming mold surface. The forming mold is then removed to a support housing where the vacuum is continued until the excess water is extracted from the wet kraft fiber deposit. Introduced into the female cavity containing the wet fiber deposit is a conventional rigid plastic foam, such as, polyurethane foam components in an amount consistent with the size of the cavity and formulated to provide a foam density of 3 to 5 pounds per cubic foot. The cavity is securely closed with a cover by clamps or pressure and the foam is permitted to rise and cure fully for a period of from 3 to 20 minutes in accordance with the particular formulation utilized. The cover is removed and the form is displaced from the cavity by blowing compressed air into the housing. The fiber and foam product is placed in a drying oven at a temperature range of 200°F to 300°F until the kraft fiber is dry. The resulting product, a dimensionally accurate, structurally supported, shaped fiber article.

Inasmuch as the present invention is subject to many variations, modifications and changes in detail, it is intended that all matters contained in the foregoing descriptions or shown on the accompanying drawing shall be interpreted as illustrative and not in a limiting sense.

What is claimed is:

1. A method of producing dimensionally accurate, structurally supported, shaped articles of pulped fibers comprising the steps of
   forming a wet felted mat of pulped fibers on a foraminous forming mold, the wet felted mat having a hollow portion;
   filling the hollow portion of the wet felted mat with a core material while the wet felted mat is supported on the foraminous forming mold;
   curing the core material and bonding the same to the wet felted mat to form a core integral with the wet felted mat;
   removing the wet felted mat and core from the foraminous forming mold with the core acting in a transfer support capacity before drying of the wet felted mat; and
   drying the wet felted mat.

2. The method as recited in claim 1 wherein said filling step includes filling the hollow portion of the wet felted mat with a liquid foamable polymer, and said bonding step includes foaming and curing the polymer in situ.

3. The method as recited in claim 1 wherein said filling step includes disposing an aggregate and an adhesive in the hollow portion, and said bonding step includes bonding the aggregate to the wet felted mat.

4. The method as recited in claim 3 wherein the aggregate includes expanded polystyrene beads.

5. The method as recited in claim 1 wherein said forming step includes supporting the foraminous forming mold in a forming housing immersed in a slurry of pulped fibers and liquid, and supplying a vacuum to the forming housing to draw the pulped fibers to the foraminous forming mold to form the wet felted mat thereon, and further comprising the step of transfering the wet felted mat and foraminous forming mold to a filling housing prior to said filling step.

6. The method as recited in claim 5 wherein said removing step includes supplying compressed air to the filling housing.

7. The method as recited in claim 1 wherein said core material is a plastic foam and the curing and bonding thereof is effected by the exothermic reaction of the plastic foam.

8. The method as recited in claim 7 wherein said core material further includes an aggregate filler.

9. The method as recited in claim 1 wherein said core material includes an aggregate filler and a bonding adhesive.

10. The method as recited in claim 9 wherein said aggregate filler includes expanded polystyrene beads.

* * * * *